(12) United States Patent
Worpenberg et al.

(10) Patent No.: US 6,543,076 B1
(45) Date of Patent: Apr. 8, 2003

(54) CABIN FOR A TELESCOPIC GANGWAY

(75) Inventors: Friedhelm Worpenberg, Kassel (DE); Lothar Scharf, Bad Soden-Allendorf (DE)

(73) Assignee: Thyssen Henschel Airport Systems GmbH (DE)

( * ) Notice: Subject to any disclaimer, the term of this patent is extended or adjusted under 35 U.S.C. 154(b) by 0 days.

(21) Appl. No.: 09/914,488

(22) PCT Filed: Mar. 3, 2000

(86) PCT No.: PCT/EP00/01839
§ 371 (c)(1),
(2), (4) Date: Aug. 27, 2001

(87) PCT Pub. No.: WO00/55038
PCT Pub. Date: Sep. 21, 2000

(30) Foreign Application Priority Data

Mar. 17, 1999 (DE) .......................................... 199 11 879

(51) Int. Cl.⁷ ................................................ B64F 1/305
(52) U.S. Cl. ......................................... 14/71.5; 14/69.5
(58) Field of Search ................................ 14/69.5, 71.1, 14/71.5, 71.7

(56) References Cited

U.S. PATENT DOCUMENTS

| | | | |
|---|---|---|---|
| 3,121,243 A | | 2/1964 | Phillips |
| 3,412,412 A | * | 11/1968 | Kjerulf et al. ................ 14/71.5 |
| 3,644,952 A | * | 2/1972 | Hatch ......................... 14/71.1 |
| 3,693,204 A | | 9/1972 | Eggert, Jr. |
| 3,703,737 A | * | 11/1972 | Eggert, Jr. .................... 14/71.1 |
| 4,864,672 A | * | 9/1989 | Altieri et al. ................. 14/69.5 |
| 5,761,757 A | | 6/1998 | Mitchell et al. |
| 5,853,150 A | * | 12/1998 | Kuchenbrod ................. 14/71.5 |
| 5,950,266 A | * | 9/1999 | Streeter et al. .............. 14/69.5 |
| 6,122,789 A | * | 9/2000 | Stephenson et al. ......... 14/71.5 |
| 6,186,734 B1 | * | 2/2002 | Maurer ....................... 14/71.1 |

FOREIGN PATENT DOCUMENTS

| | | | |
|---|---|---|---|
| DE | 15 31 482 A | 12/1969 | |
| DE | 2854172 A | * 6/1980 | ............. B64F/1/30 |
| DE | 3023885 A | * 1/1982 | ............. B64F/1/31 |
| DE | 20 46 250 C2 | 4/1983 | |
| DE | 29 03 795 C2 | 4/1987 | |
| DE | 199 11 879 C1 | 8/2000 | |
| WO | WO 99/50143 | 10/1999 | |

* cited by examiner

Primary Examiner—Thomas B. Will
Assistant Examiner—Alexandra K. Pechhold
(74) Attorney, Agent, or Firm—McGlew and Tuttle, P.C.

(57) ABSTRACT

A telescopic gangway cabin has a canopy roof and a floor extending over the entire width of the canopy roof The gangway cabin can be used for docking to conventional commercial aircraft as well as to commuter aircraft. The undivided floor has a railing in the area of a lateral border of the floor and is displaceable together with the railing at right angles to the opening of the canopy roof under the side wall of the canopy roof.

20 Claims, 9 Drawing Sheets

CABIN FOR A TELESCOPIC GANGWAY

FIELD OF THE INVENTION

The present invention pertains to a telescopic gangway cabin with a canopy roof and a floor extending over the entire width of the canopy roof

BACKGROUND OF THE INVENTION

Various embodiments of such telescopic gangway cabins have been known. They are docked with usual commercial airplanes, whose doors can be pivoted and thus opened around essentially vertical axes.

There are also so-called commuter airplanes whose doors are articulated on horizontal axes in the lower area and are pivoted to the outside for opening until their top edge reaches the ground. These doors are provided with stairs on the inside, so that they can also be handled without a telescopic gangway. The stairs may have one or two railings.

A prior-art telescopic gangway cabin of the type described in the introduction (U.S. Pat. No. 3,121,243) can also be used to handle commuter airplanes. However, the free front side of the floor must not be moved immediately up to the airplane for this purpose, but it must remain at some distance from the airplane because of the stairs having been pivoted out. A transition ramp is laid over the remaining gap.

In another prior-art embodiment (U.S. Pat. No. 5,761,757), the floor under the canopy roof is divided, and a mobile part of the floor can be pushed under the stationary part of the floor. Even though the floor of this telescopic gangway cabin can be moved directly up to the airplane, where it is supported with a contact threshold (bumper), the section of the contact threshold located in the area of the mobile part of the floor must also be removed from the area of the gap formed by the mobile floor part during docking with a commuter airplane. All this is complicated in terms of design and function.

Moreover, the connection end of an access gangway for airplanes has been known from DE 15 31 482 A, where the floor comprises a part firmly connected to the gangway and a mobile part, which is pivotably articulated around a vertical axis on a stationary floor part approximately in the middle of the free edge of the floor and partially extends under same.

SUMMARY AND OBJECTS OF THE INVENTION

The object of the present invention is to provide a telescopic gangway cabin which is suitable for docking with both conventional commercial airplanes and commuter airplanes.

This object is accomplished by the undivided floor having a railing in the area of its lateral edge and being displaceable together with this at right angles to the opening of the canopy roof under the side wall of the said canopy roof, preferably over the entire opening of the canopy roof Such a telescopic gangway cabin can be docked with usual commercial airplanes with retracted floor, which extends from one side to the other side of the canopy roof If the telescopic gangway cabin is to be docked with a commuter airplane, the floor is laterally extended into its end position and the telescopic gangway cabin is then moved up to the commuter airplane such that the open door of the airplane with the stairs and optionally with the railing enters the gap released by the extended floor. The extended floor is then again retracted to the extent that it will be located in front of the door opening of the commuter airplane or its railing next to the railing of the stairs of the airplane.

From the viewpoint of design, a preferred embodiment is characterized in that on the underside, the floor has two running rails extending at right angles to the opening of the canopy roof for support rollers, which engage the said running rails and are mounted on spars of the gangway structure. With the floor retracted, one of the spars shall be arranged approximately in the middle under the floor and another spar in the area of the lateral, railing-free edge of the floor. The guiding of the floor on support rollers makes possible a simple displacement of the floor, optionally also manually.

However, it is also possible to associate the floor with a drive for the lateral displacement. This drive may be of a mechanical, hydraulic or even electrical design. A motor, which is fastened to a spar and engages with a pinion a roller chain, whose two ends are fastened in the area of the lateral edges of the floor, is provided as the drive in a preferred embodiment of the present invention. In particular, at least one end of the roller chain can be held with a tensioning screw.

Limit switches for the drive or also stops for travel limitation of the floor may be provided in the area of the ends of the roller chain. Furthermore, a slip clutch may be arranged for torque limitation between the motor and the pinion.

For docking with commuter airplanes, whose stairs provided on the inside at the door have railings, a transition ramp may be provided for covering the opening formed under the canopy roof next to the laterally displaced floor. This transition ramp may preferably be arranged as a fold-out ramp on the outside at the railing of the floor.

Since the floor as a whole is displaceable at right angles to the opening of the canopy roof, a continuous contact threshold (bumper) made of a profile with triangular cross section may also be arranged in front of the free front side of the floor. It is obvious that this contact threshold consists of a flexible, elastic material. The triangular cross section easily fits all conditions and makes possible a continuous transition between the floor of the telescopic gangway cabin and the floor in the airplane.

In order for this transition to remain comfortable and accident-proof for the passengers even during the docking of a telescopic gangway which extends in parallel to the airplane and is also extremely sloped (1:10), this should be made possible with a special embodiment in the form of a cabin floor which is additionally also adjusted horizontally. In this embodiment, the above-mentioned spars are expanded into a support frame, which is connected to a cantilever beam arranged on the cabin approximately in the middle of the cabin in an articulated manner and can be pivoted around an especially horizontal axis of rotation by means of an adjusting drive and adjusted to the extent that the cabin floor laterally displaceable on this support frame comes into a horizontal position corresponding to the floor of the airplane. Triangular ramps, which are fastened to the support frame and to the floor of the telescopic gangway by means of hinges, are provided at the transition from the horizontal cabin floor to the sloped (1:10) floor of the telescopic gangway.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
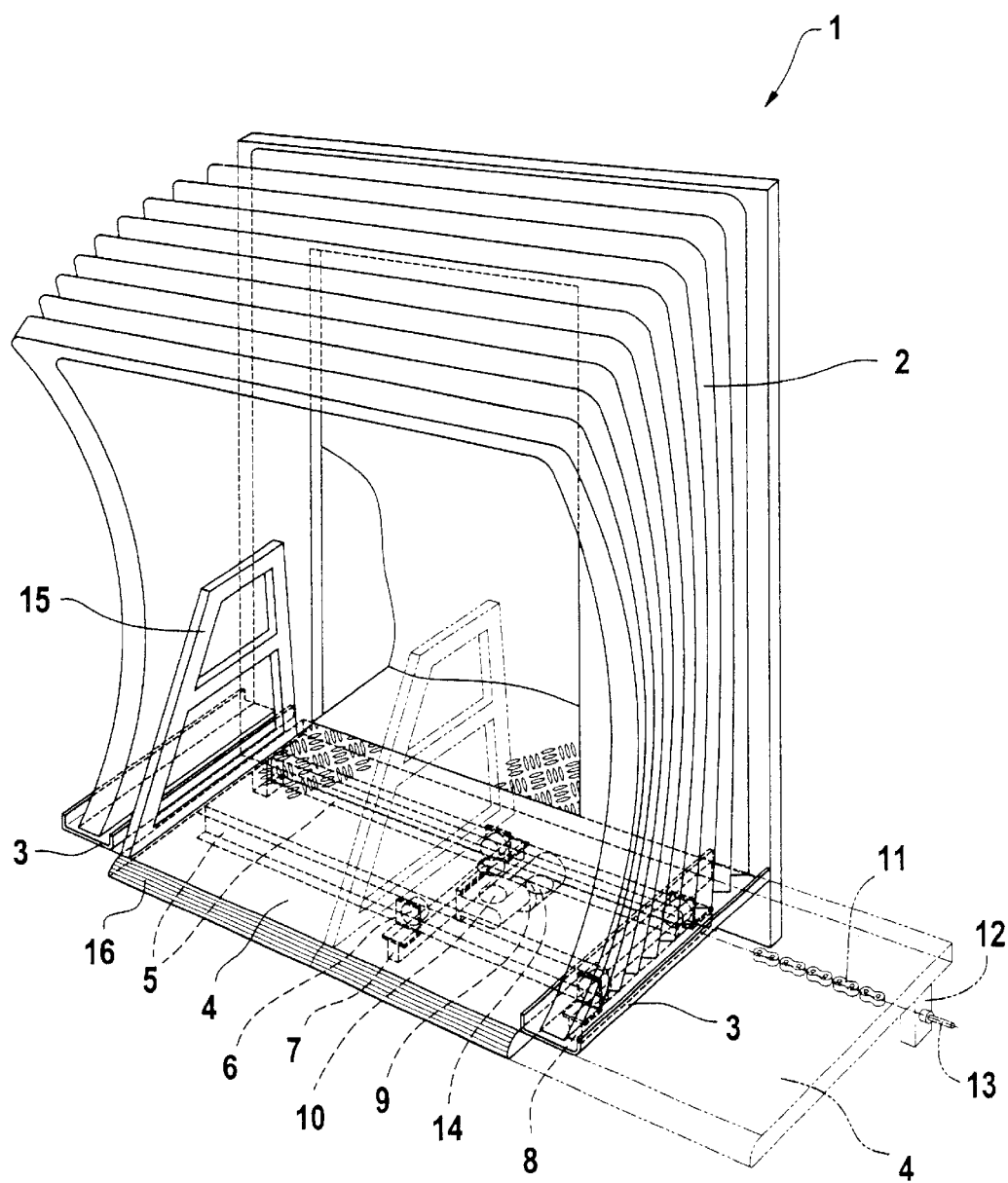
FIG. 1 is a schematically perspective view of a telescopic gangway cabin obliquely from the top.
Figure 2:
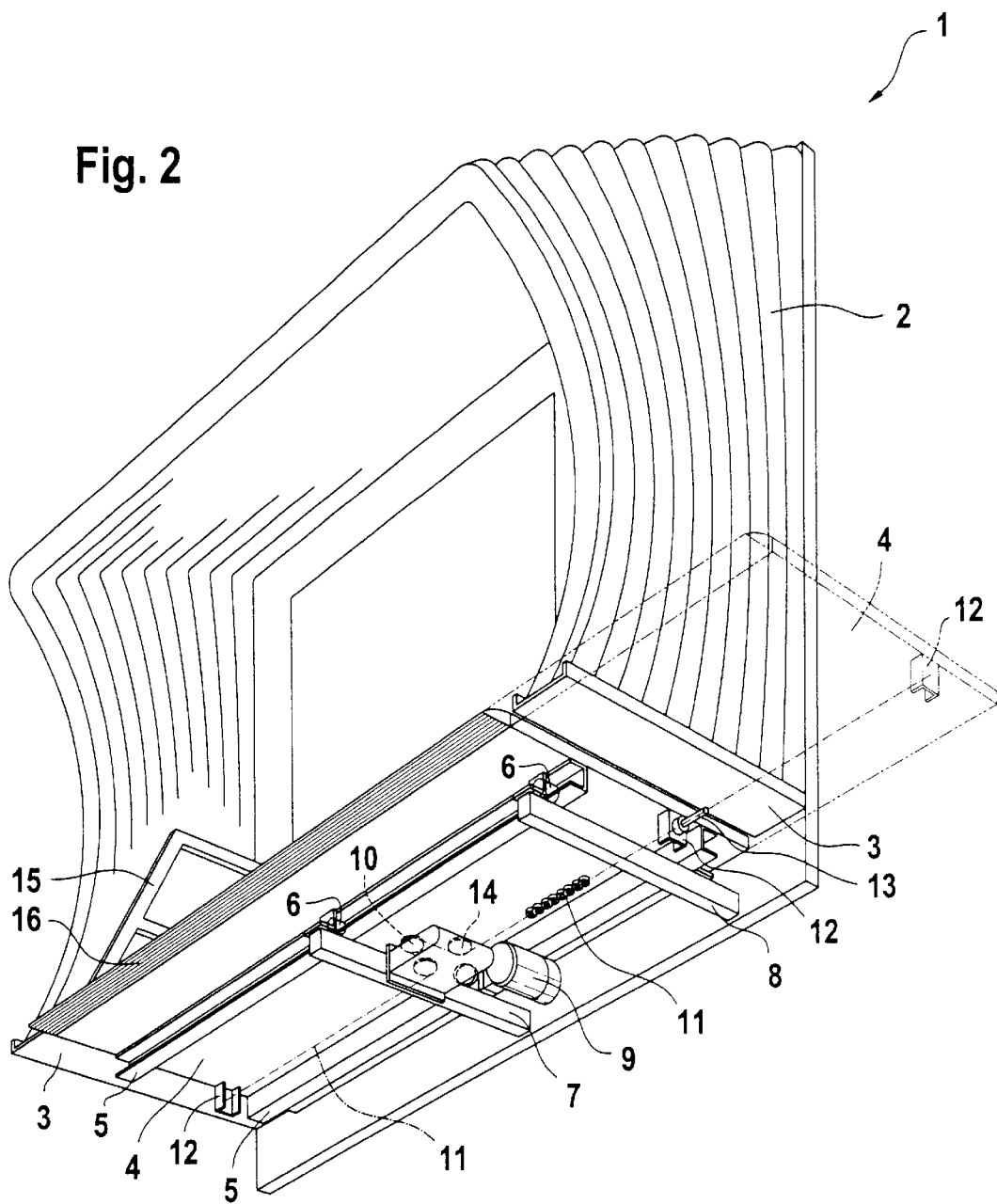
FIG. 2 is the subject according to FIG. 1 in a view obliquely from the bottom.

Referring to the drawings in particular, a canopy roof 1 with corrugated side wall belongs to the telescopic gangway cabin shown in FIGS. 1 and 2. The side walls 2 are supported at their lower ends on carriers 3, which are connected to the structure of the telescopic gangway, which is not shown specifically. A continuous, undivided floor 4, whose top side is arranged somewhat below the underside of the carriers 3, extends between the side walls 2 of the canopy roof 1. Two running rails 5 have a U-shaped cross section in the embodiment being shown. The running rails are arranged in parallel to one another and at mutually spaced locations from one another and extend at right angles to the opening of the canopy roof 1 and are located on the underside of the floor 4. Support rollers 6, which are mounted on the spars 7, 8 of the gangway structure, engage the running rails 5. With the floor 4 retracted, the spar 7 is located approximately in the middle under the floor 4 and the other spar 8 is arranged in the area of the lateral edge of the floor 4.

Figure 7:
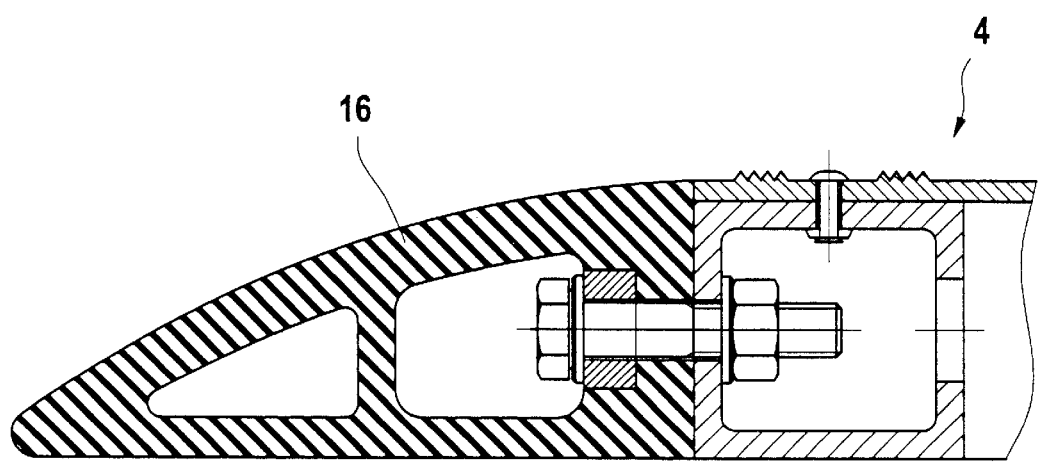
FIG. 7 is a partially a cross sectional view through the floor with a contact threshold arranged in front of it.

An electric motor 9, which engages with a pinion 10 a roller chain 11, which extends in parallel to the running rails 5 and tie two ends of which are fastened to brackets 12 in the area of the lateral edges of the floor 4, is fastened to the spar 7. The roller chain II runs over deflecting rollers 14 in the area of the pinion 10. The floor 4 can be moved as a whole at right angles to the opening of the canopy roof 1 by means of this drive. The floor 4 extending between the two side walls 2 of the canopy roof 1 is indicated by solid lines in FIGS. 1 and 2. The extended floor, which now releases the opening under the canopy roof 1, which opening is not recognizable in FIGS. 1 and 2, is indicated by dash-dotted lines. FIGS. 1 and 2 also show that in the area of its lateral edge, which always remains under the canopy roof 1, the floor 4 carries a railing 15, which can also be removed depending on the needs. A continuous contact threshold (bumper) 16, which is made of a profile with triangular cross section, as is shown in FIG. 7, and consists of a flexible elastic material, is arranged in front of the front side of the floor 4.

Figure 4:
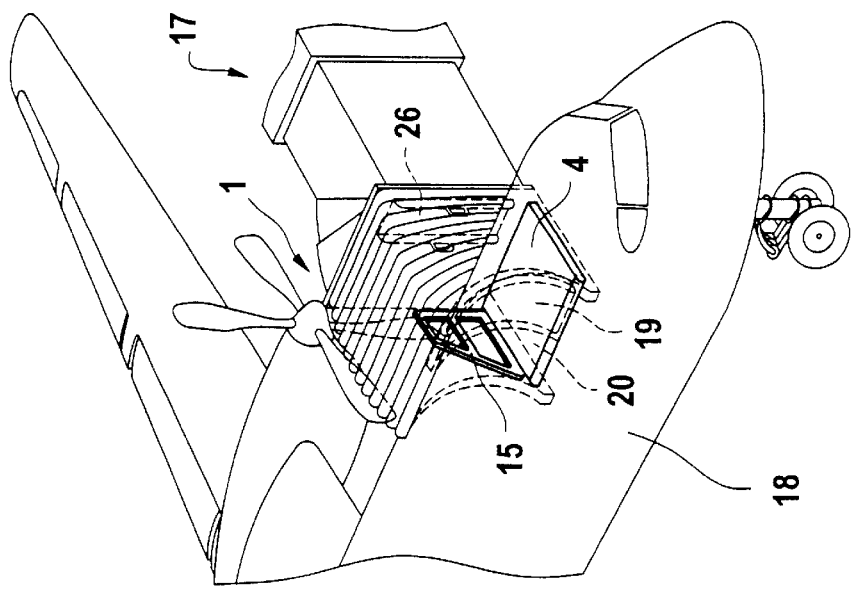
FIG. 4 is a schematic perspective view of a telescopic gangway cabin docked with a conventional commercial airplane.

FIG. 4 shows how the telescopic gangway cabin joining the telescopic gangway 17 is docked with a commercial airplane 18, whose door 19, which can be pivoted away laterally, releases an entry opening 20. The floor 4 drawn in bold lines with the railing 15 extends between the side walls 2 of the canopy roof 1.

Figure 5:
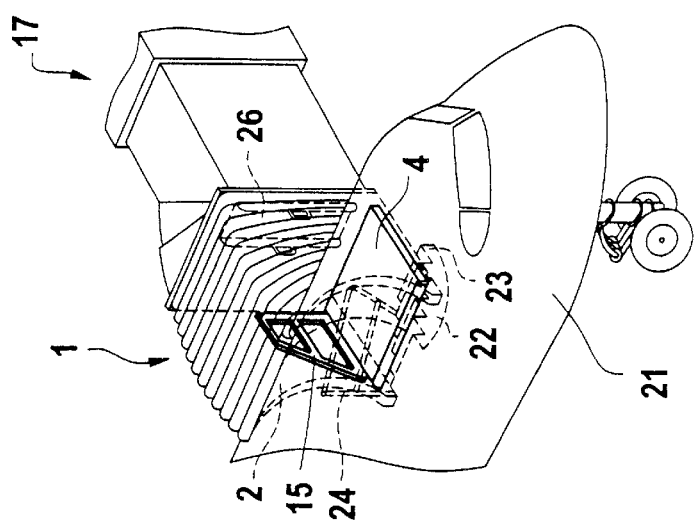
FIG. 5 is a schematic perspective view showing the subject of FIG. 4, docked with a commuter airplane.

FIG. 5 explains the docking with a commuter airplane 21, whose door 22, which can be pivoted in the downward direction, is equipped on the inside with stairs 23 and a railing 24 on one side. Before docking, the floor 4 with its railing 15 is laterally extended and the telescopic gangway cabin is then docked with the commuter airplane such that the railing 24 of the airplane will be located right next to a wall side 2 of the canopy roof 1. The floor 4 with is the railing 15 is then again retracted until the two railings 15 and 24 are located right next to one another and the door opening of the commuter airplane 21 is freely accessible.

Figure 3:
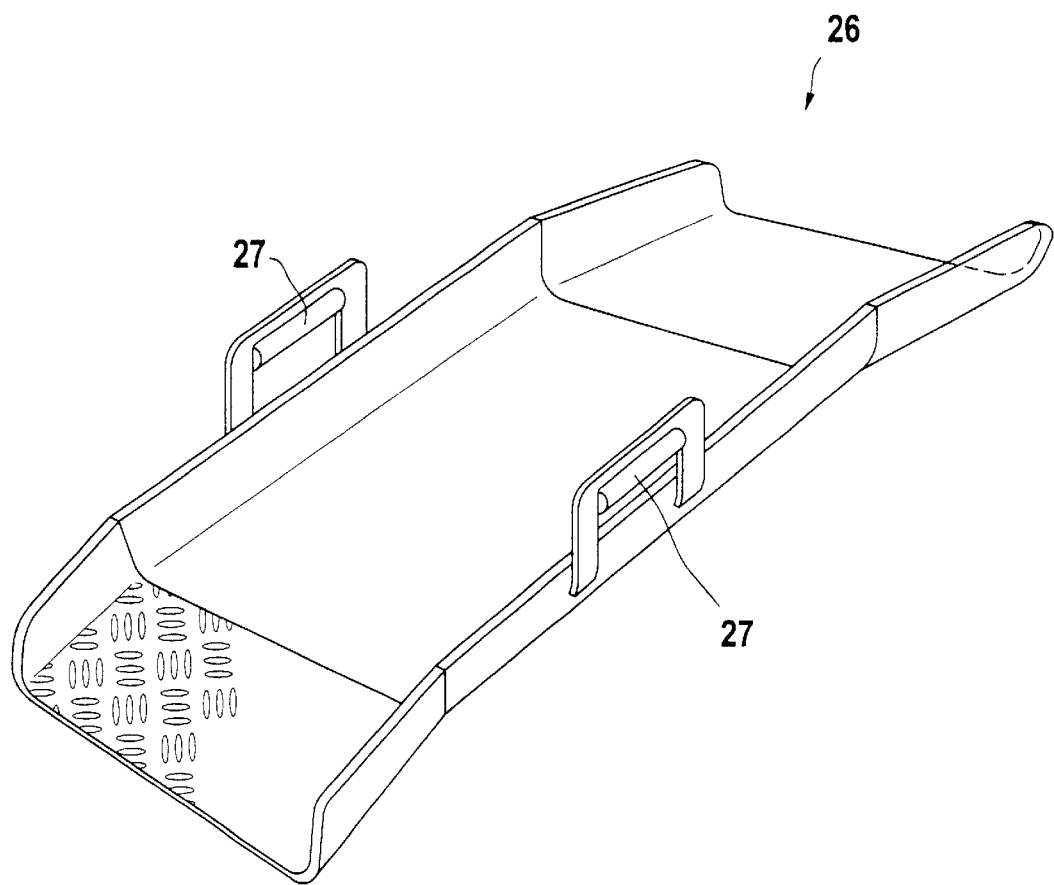
FIG. 3 is a schematically perspective view of a transition ramp.
Figure 6:
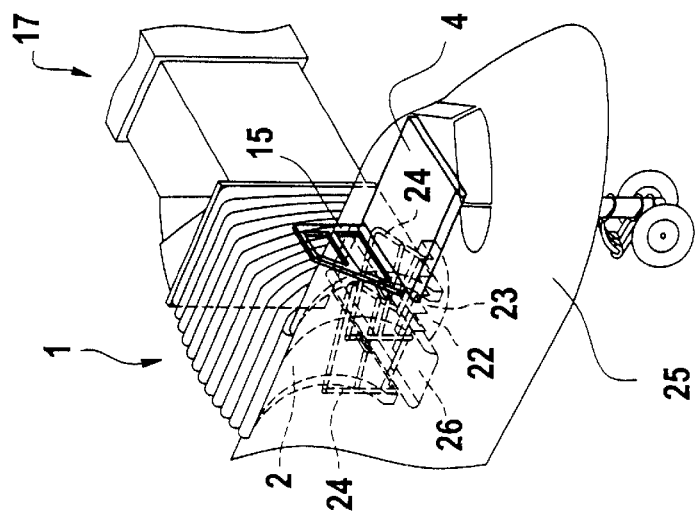
FIG. 6 is a schematic perspective view showing the subject according to FIG. 5, docked with another commuter airplane.

FIG. 6 shows the docking with another commuter airplane 25, whose stairs arranged on the inner side of the door 22 have railings 24 on both sides. For docking, the floor 4 with its railing 15 is again extended laterally to the extent that the stairs 23 with the railings 24 provided on both sides can engage the gap between the side wall 2 and the railing 15. A transition ramp 26 is then placed over the opening formed under the canopy roof 1 next to the laterally displaced floor 4 in order to make possible the access to the commuter airplane 25. Such a transition ramp is shown in FIG. 3. In the embodiment shown in FIG. 3, the transition ramp 25 has lateral handles 27. In another embodiment, not shown, the transition ramp 26 is arranged on the outside at the railing 15 of the floor 4 as a fold-out ramp.

Figure 8:
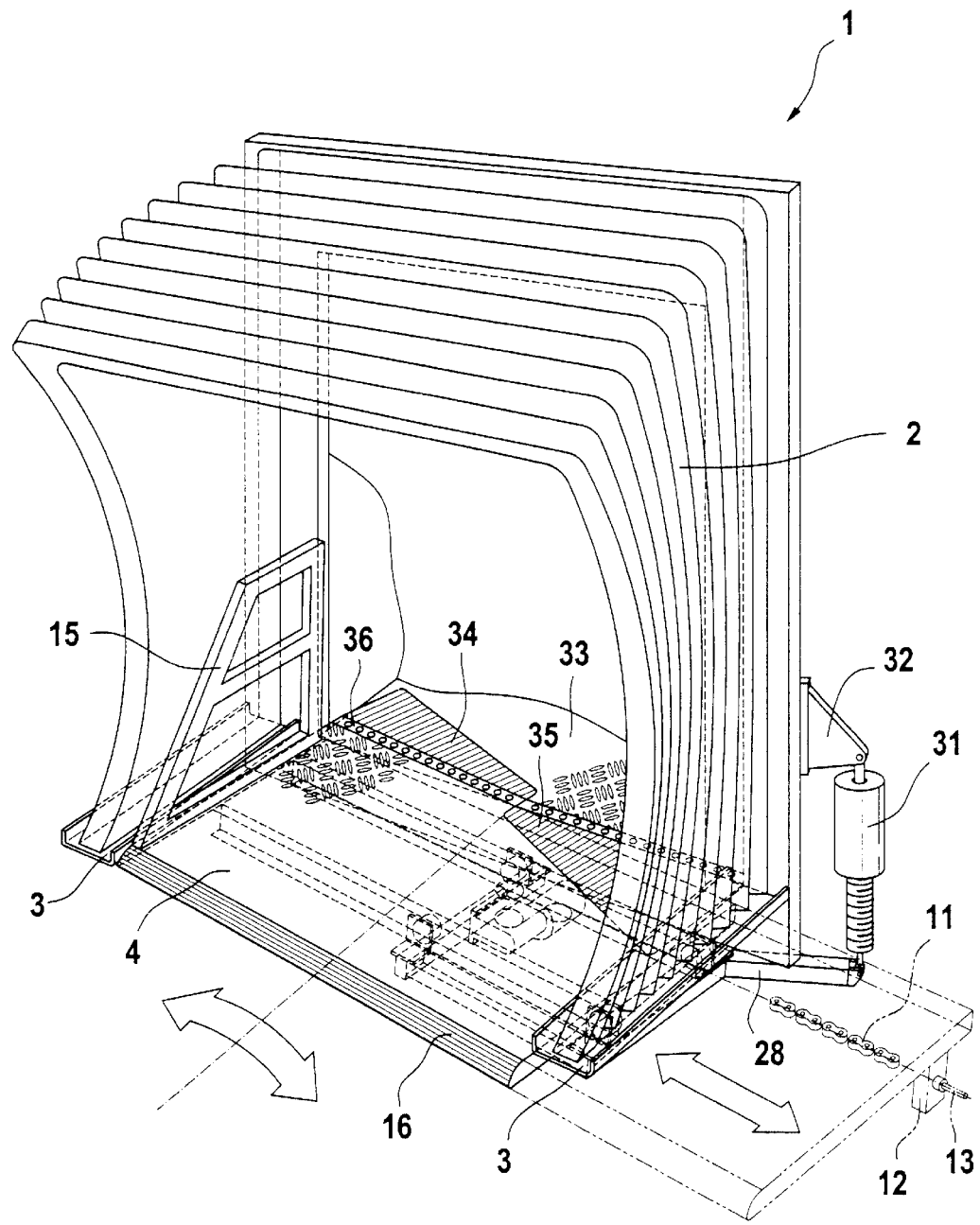
FIG. 8 is a schematic perspective view of a telescopic gangway cabin obliquely from the top with a cabin floor, which is not only displaceable laterally, but is additionally also adjustable horizontally.
Figure 9:
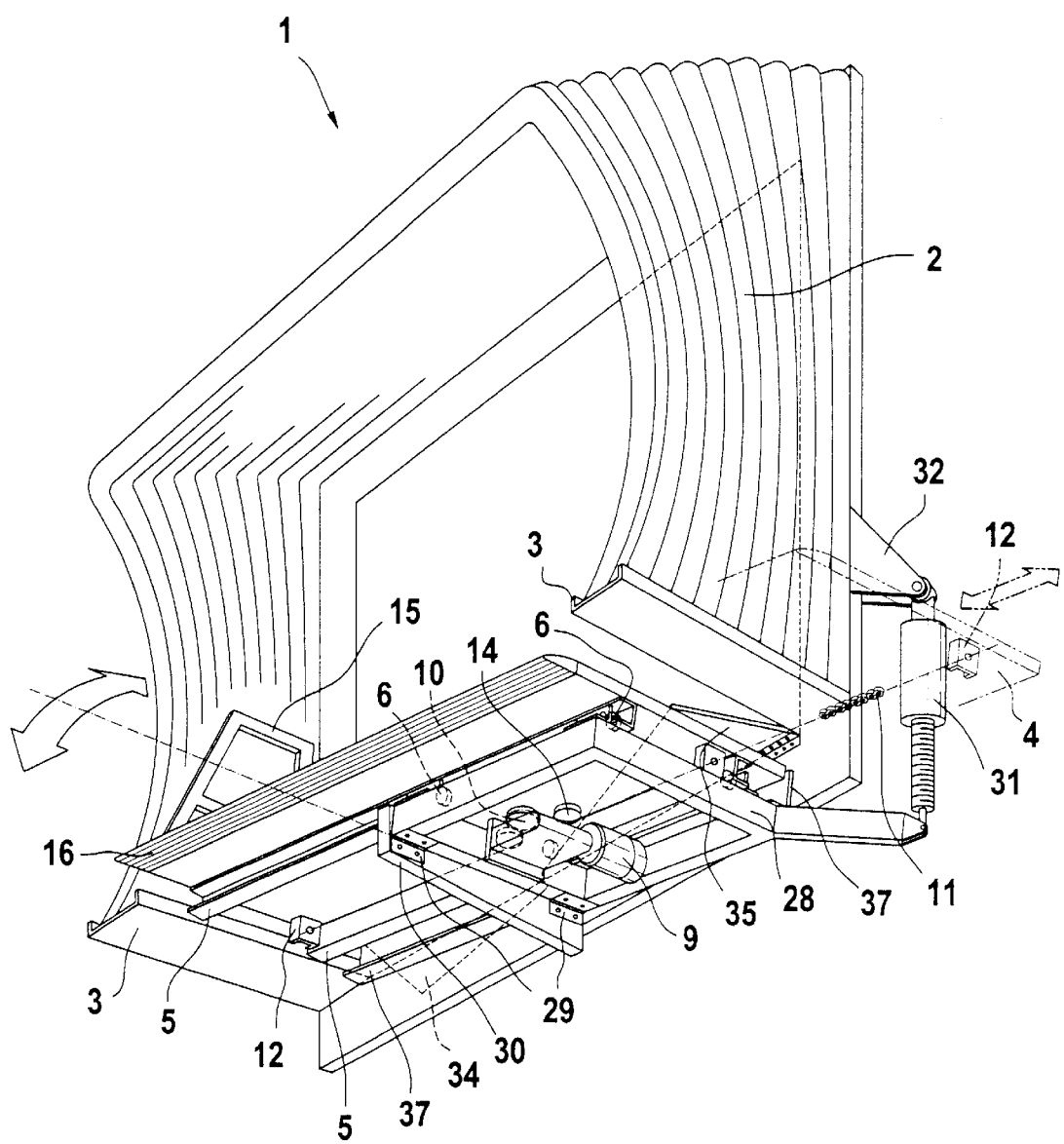
FIG. 9 is a schematic perspective view of the subject according to FIG. 8 in a view obliquely from the bottom.

The telescopic gangway cabin shown in FIGS. 8 and 9 differs from the abovedescribed one essentially by the following features:

The laterally displaceable floor 4 with its two running rails 5 is supported via support rollers 6 on a support frame 28, which is fastened by means of hinges 29 to a cantilever beam 30 arranged, e.g., in the middle of the cabin, on the one hand, and, on the other hand, it is fastened, likewise in an articulated manner, to a telescopic gangway cabin via an adjusting drive 31 and a bracket 32. The floor 4 can be adjusted by means of the adjusting drive 31 to the extent that it comes into a horizontal position corresponding to the floor of the aircraft even with the telescopic gangway 17 in an extremely sloped (1:10) position. Triangular ramps 34 and 35, which are fastened to the support frame 28 and to the floor of the telescopic gangway 33 by means of hinges 36, are provided at the transition from the horizontal floor 4 to the sloped floor 33 of the telescopic gangway 17, and the support frame 28 is provided for this purpose with a support angle 37 extending over the entire width of the floor 4. The lateral displaceability of the floor 4 is achieved in the same manner with the same means as was described in detail for the telescopic gangway cabin documented with FIGS. 1 and 2.

Figure 10:
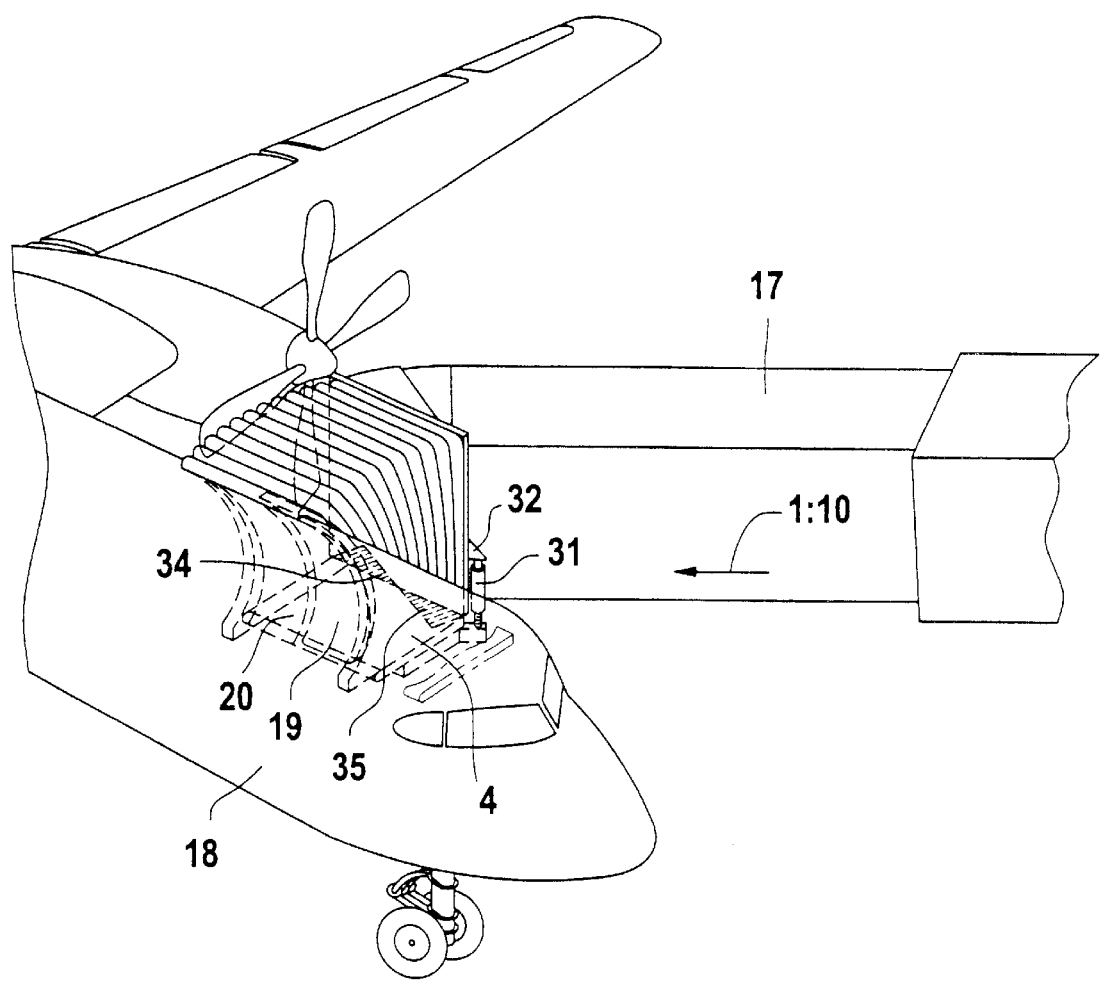
FIG. 10 is schematic perspective view showing the subject according to FIG. 8, docked with a commuter airplane.
Figure 11:
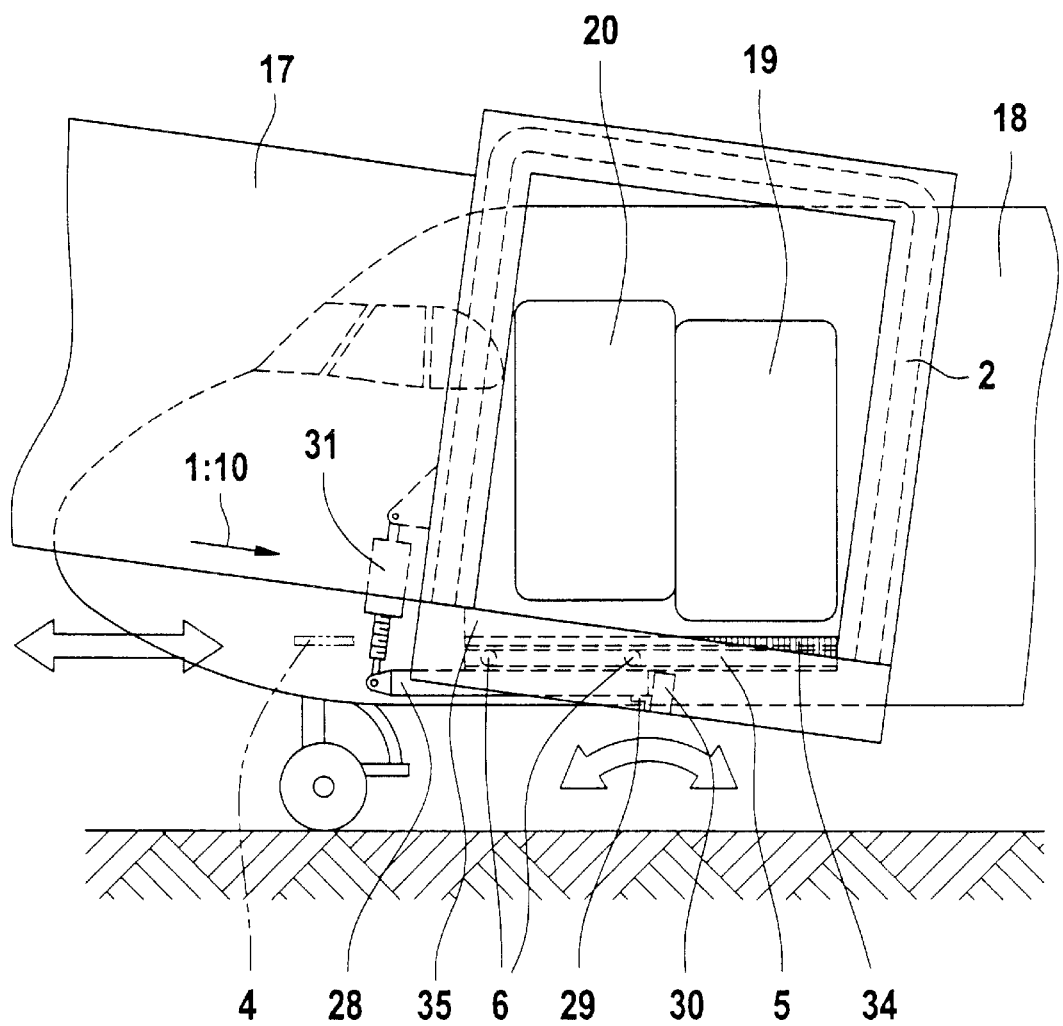
FIG. 11 is a side view, partially in section, showing the subject according to FIG. 8, docked with a commuter airplane with highlighted view of the situation in which the telescopic gangway is sloped at a ratio of 1:10.

FIGS. 10 and 11 show the situation during the handling of a commuter airplane 18 with an extremely sloped telescopic gangway 17 docked nearly in parallel with the airplane, where the floor 4 has been brought into a position parallel to the floor of the airplane according to FIG. 11 by means of the adjusting drive 31 around an essentially horizontal axis of rotation in the area of the hinges 29. Corresponding to FIG. 10, the triangular ramps 34 and 35 are fastened on one side to the floor 4 in an articulated manner and they cover the triangular openings formed by the pivoting of the cabin floor between the cabin floor 4 and the floor 33 of the sloped telescopic gangway.

While specific embodiments of the invention have been shown and described in detail to illustrate the application of the principles of the invention, it will be understood that the invention may be embodied otherwise without departing from such principles.

What is claimed is:

1. A telescopic gangway cabin, comprising:
   a canopy roof with an opening, the opening extending from one side wall to another side wall;
   an undivided floor extending in a closed position over the entire width of the canopy roof and with an upper surface uninterrupted from said one side wall to said another side wall; and
   an undivided floor railing connected to said undivided floor in an area of a lateral edge of said undivided floor adjacent to said one side wall in said closed position, said undivided floor railing together with said undivided floor being displaceable at right angles to a vertical portion of said one side wall and said another side wall and displaceable relative to said one side wall and relative to said another sidewall as said railing together with said undivided floor move from said closed position into a retracted position.

2. A telescopic gangway cabin in accordance with claim 1, further comprising:
   a gangway floor having a front edge;
   two running rails at an underside of said floor, extending at right angles to a vertical portion of said one side wall and said another side wall;
   gangway structure spars connected to said gangway floor, support rollers engaging said running rails and mounted on said spars of said gangway structure.

3. A telescopic gangway cabin in accordance with claim 2, wherein said undivided floor railing together with said undivided floor are displaceable from said closed position into said retracted position and said spars are disposed such that with said floor in said retracted position one of said spars is arranged approximately in the middle under said undivided floor and another of said spars is arranged in an area of an edge of said floor, which said edge is free from said railing on a side.

4. A telescopic gangway cabin in accordance with claim 1, wherein a drive for displacement is associated with said undivided floor.

5. A telescopic gangway cabin in accordance with claim 4, further comprising:
   a roller chain with two ends fastened in the area of lateral edges of said undivided floor;
   a pinion; and
   a motor fastened to one of said spars, said motor providing a drive which engages with said pinion for moving said roller chain.

6. A telescopic gangway cabin in accordance with claim 5, wherein at least one end of said roller chain is held with a tensioning screw.

7. A telescopic gangway cabin in accordance with claim 5, further comprising:
   limit switches for the drive or for stops are provided in the area of ends of said roller chain.

8. A telescopic gangway cabin in accordance with claim 5, further comprising a slip clutch inserted for torque limitation between said motor and said pinion.

9. A telescopic gangway cabin in accordance with claim 1, further comprising:
   a transition ramp wherein said undivided floor railing together with said undivided floor are displaceable at right angles to the opening of said canopy roof into a retracted position, said transition ramp covering an opening formed next to said floor in said retracted position under said canopy roof.

10. A telescopic gangway cabin in accordance with claim 9, wherein said transition ramp is arranged on an outside at said railing of said uninterrupted floor as a fold-out ramp.

11. A telescopic gangway cabin in accordance with claim 1, further comprising:
    a contact threshold bumper consisting of a profile with a triangular cross section extending continuously in front of a free front side of said undivided floor.

12. A telescopic gangway cabin in accordance with claim 1, further comprising:
    a support frame pivotable along the opening of said canopy roof;
    at least two running rails connected to said support frame; and
    support rollers engaging said rails and fastened to said frame.

13. A telescopic gangway cabin in accordance with claim 12, further comprising:
    a gangway floor having a front edge;
    a gangway structure connected to said gangway floor and with a cantilever beam arranged rigidly on the gangway structure approximately in the middle of the cabin; and
    pivot mounts for fastening said support frame to said cantilever beam in an articulated manner, said two running rails extending in parallel to said front edge of said gangway floor when said support frame is not pivoted relative to said gangway floor.

14. A telescopic gangway cabin in accordance with claim 12, further comprising:
    a drive including one of a mechanical spindle drive and a hydraulic push-pull cylinder fastened in an articulated manner to said support frame; and
    a bracket provided as a adjusting drive for pivoting said undivided floor.

15. A telescopic gangway cabin in accordance with claim 12, further comprising: triangular transition ramps are fastened in an articulated manner to said support frame in a transition area between said undivided floor and said gangway floor such that they do not hinder the displacement of said undivided floor.

16. A telescopic gangway cabin in accordance with claim 13, further comprising:
    a drive including one of a mechanical spindle drive and a hydraulic push-pull cylinder fastened in an articulated manner to said support fame; and
    a bracket provided as a adjusting drive for pivoting said undivided floor.

17. A telescopic gangway cabin in accordance with claim 13, further comprising: a triangular transition ramp fastened in an articulated manner to said support frame in a transition area between said undivided floor and said gangway floor such that they do not hinder the displacement of said floor.

18. A telescopic gangway cabin in accordance with claim 14, further comprising: triangular transition ramps fastened in an articulated manner to said support frame in a transition area between said floor and said floor such that they do not hinder the displacement of said undivided floor.

19. A telescopic gangway cabin, comprising:

a gangway floor having a front edge;

a canopy roof with an opening the opening extending from one side wall to another side wall, said canopy roof being connected to said gangway floor;

an undivided floor extending in a closed position over the entire width of the canopy roof and having an uninterrupted upper surface extending substantially from said one side wall to said another side wall;

an undivided vertically standing railing connected to said undivided floor in an area of a lateral edge of said undivided floor adjacent to said one side wall in said closed position, said undivided floor railing being laterally displaceable relative to the canopy roof together with said undivided floor from said closed position to a retracted position with the movement being substantially in parallel to said front edge of said gangway floor;

two running rails extending at an underside of said floor, extending in parallel to said front edge of said gangway floor;

gangway structure spars connected to said gangway floor, support rollers engaging said running rails and mounted on said spars of said gangway structure.

20. A telescopic gangway cabin, comprising:

a gangway floor having a front edge;

a canopy roof with an opening, the opening extending from one side wall to another side wall, said canopy roof being connected to said gangway floor;

an undivided floor extending in a closed position over the entire width of the canopy roof and having an uninterrupted upper surface extending substantially from said one side wall to said another side wall;

an undivided vertically standing floor railing connected to said undivided floor in an area of a lateral edge of said undivided floor adjacent to said one side wall in said closed position, said undivided floor railing being displaceable together with said undivided floor from said closed position to a retracted position with the direction of movement being substantially at a right angle to said one side wall and said another side wall and movable laterally with respect to said one side wall and said another side wall;

a continuous contact threshold bumper extending uninterrupted along a free front side of said undivided floor substantially from said one side wall to said another side wall, said continuous contact threshold bumper having an upper surface cooperating with said uninterrupted upper surface of said undivided floor to provide a combined uninterrupted surface extending substantially from one side wall to said another side wall.

* * * * *